United States Patent [19]

Swanson

[11] Patent Number: 5,378,083
[45] Date of Patent: Jan. 3, 1995

[54] DUST RECYCLING FOR SOIL REMEDIATION SYSTEM

[75] Inventor: Malcolm L. Swanson, Chickamauga, Ga.

[73] Assignee: Astec Industries, Inc., Chattanooga, Tenn.

[21] Appl. No.: 35,343

[22] Filed: Jul. 13, 1993

[51] Int. Cl.⁶ ............................................. B09B 3/00
[52] U.S. Cl. ................................. 405/128; 432/14; 110/346
[58] Field of Search ............. 405/128, 129; 588/256, 588/249, 251; 432/13, 14

[56] References Cited

U.S. PATENT DOCUMENTS

| | | |
|---|---|---|
| 4,211,490 | 7/1980 | Brock et al. |
| 4,298,287 | 11/1981 | McCarter, III et al. |
| 4,402,274 | 9/1983 | Meenan et al. ........................ 110/346 |
| 4,555,182 | 11/1985 | Mendenhall . |
| 4,648,333 | 3/1987 | Mudd et al. . |
| 4,793,937 | 12/1988 | Meenan et al. ........................ 210/771 |
| 4,827,854 | 5/1989 | Collette . |
| 4,867,572 | 9/1989 | Brock et al. |
| 4,927,293 | 5/1990 | Campbell ............................... 405/128 |
| 4,957,429 | 9/1990 | Mendenhall . |
| 5,052,858 | 10/1991 | Crosby et al. ........................ 405/128 |
| 5,085,581 | 2/1992 | Mendenhall . |
| 5,088,856 | 2/1992 | Yocum ................................. 405/131 X |
| 5,129,334 | 7/1992 | Mize . |
| 5,176,445 | 1/1993 | Mize . |
| 5,193,291 | 3/1993 | Brashears . |
| 5,193,935 | 3/1993 | Musil ..................................... 405/128 |
| 5,240,412 | 8/1993 | Mendenhall . |
| 5,302,118 | 4/1994 | Renegar et al. ........................ 432/14 |

FOREIGN PATENT DOCUMENTS

3216771A1 5/1982 Germany .

*Primary Examiner*—Dennis L. Taylor
*Attorney, Agent, or Firm*—Nilles & Nilles

[57] ABSTRACT

A soil remediation system uses heat from remediated soil to vaporize volatiles from contaminated dust without pollution. Preferably, this remediation takes place in a dust remediator which is located proximate a primary treatment unit for contaminated soil, which vaporizes volatiles from the dust using heat from remediated soil, and which directs the volatiles into the primary treatment unit for oxidation. The primary treatment unit may comprise a rotary drum, and the dust remediator may comprise a shroud covering the remediated soil outlet end of the drum and receiving the remediated soil and the dust. The remediated soil and the dust are combined in the shroud so as to maximize vaporization of contaminants while minimizing agitation of the dust, and the combined soil and dust are then discharged together from a remediated products outlet of the shroud.

15 Claims, 3 Drawing Sheets

DUST RECYCLING FOR SOIL REMEDIATION SYSTEM

CROSS REFERENCE TO RELATED APPLICATIONS

The claims of the present application are believed to be supported by co-pending application Ser. No. 08/014,767, now U.S. Pat. No. 5,302,118, which shares at least one inventor with the present application. Priority based on the earlier application is hereby claimed pursuant to 35 U.S.C. §120.

BACKGROUND OF THE INVENTION

1. Field of the Invention

The invention relates to soil remediation systems and, more particularly, relates to soil remediation systems having rotary drum-type treatment units and to systems for handling dust discharged from such treatment units.

2. Discussion of the Related Art

Soil remediation systems are increasingly used to treat soil contaminated with hydrocarbons or other combustible volatiles. The typical system includes at least a primary treatment unit and a baghouse. The primary treatment unit typically comprises an inclined rotary drum having a contaminated soil inlet and a remediated soil outlet at opposite ends thereof. A burner supplies heat to the outlet end of the drum.

During the remediation process, contaminated soil is fed into the drum and conveyed from the inlet end to the outlet end under rotation of the drum and heated by the burner such that the volatiles are vaporized. Hot gases produced by the remediation process entrain dust and other particulates as they flow through the drum, particularly if the gases are exhausted through the stream of incoming soil for heat exchanges purposes, and are thus heavily laden with particles when they are discharged from the exhaust outlet of the drum. A cyclone or the like is provided between the treatment unit and the baghouse to remove by gravity at least the larger dust particles entrained by the gases. The remaining particles are oxidized in an afterburner and then separated from the gases in a baghouse.

One problem encountered by the type of soil remediation system described above is that the materials removed from the gas stream in the cyclone are to a large extent still contaminated because many of the particles had been entrained by the gas stream before they were heated sufficiently to vaporize the contaminants. In fact, if the exhaust gases are drawn through the incoming materials for heat exchange purposes as discussed above, many of the particles in the gas stream will not be significantly heated before they are entrained by the gas stream and withdrawn from the drum. Heretofore, these contaminated particles were remediated through recirculation through the drum for further treatment. Such recirculation necessarily decreases the capacity of the drum and, because the particles being recirculated are very fine, a relatively high percentage of these particles are again entrained by the gases in the drum and carried out of the drum, thus further decreasing system efficiency.

Various systems have been proposed which are designed to improve the handling of dust and other particulates entrained by gas streams exhausted from remediation drums. One such system, disclosed in U.S. Pat. No. 5,193,291 to Brashears, proposes mixing the particles removed from the gas stream with the hot remediated soil discharged from the treatment drum outlet in the baghouse. Heat is transferred during this mixing from the remediated soil to the particles to vaporize the residual hydrocarbons or other volatiles, thus at least partially remediating the particles.

The system proposed by Brashears, though at least theoretically overcoming some of the disadvantages of other known remediation systems, suffers from marked drawbacks and disadvantages. Most notably, even assuming that the remediated soil discharged from the drum is still sufficiently hot when it is conveyed to the baghouse to vaporize volatiles in the particulates upon mixing, hydrocarbons and other volatiles driven from the particles escape directly to the atmosphere, thus polluting the air. Such pollution can be avoided only through costly and complicated recirculation or scrubbing procedures. In addition, the escaped hydrocarbons could condense in the baghouse and cause a fire hazard.

OBJECTS AND SUMMARY OF THE INVENTION

It is therefore an object of the invention to provide a method for the low cost remediation of particulates which avoids or at least reduces air pollution.

Another object of the invention is to provide a method of the type described above which employs hot remediated soil to supply the heat required to remediate the particulates without reinserting the particulates back into the treatment drum.

In accordance with one aspect of the invention, these objects are achieved by driving volatiles from the dust or other particulates, at a location proximate a remediated soil outlet of a soil remediation unit, using heat from soil remediated by the unit to vaporize the volatiles. The vaporized volatiles are then directed back into the soil remediation unit. The driving step preferably comprises conveying the dust to the designated location, and then covering the dust with the remediated soil, thereby transferring heat from the remediated soil to the dust to vaporize the volatiles. The dust being remediated could come from any source, but preferably is removed from exhaust gases produced by the remediation process.

Still another object of the invention is to provide a soil remediation system which also remediates particulates such as dust entrained fin gases exhausted from the primary treatment unit of the system.

In accordance with another aspect of the invention, a soil remediation system is provided which comprises a primary treatment unit having a contaminated soil inlet and a remediated soil outlet, a burner which supplies heat to an interior of the primary treatment unit, a separator which removes dust from gases exhausted from the primary treatment unit, and a dust remediator. The dust remediator is located proximate the primary treatment unit and drives volatiles from the dust using heat from the remediated soil to vaporize the volatiles and which directs the volatiles into the primary treatment unit.

Preferably, the primary treatment unit comprises a rotary drum, and the remediator comprises a stationary shroud which covers the outlet end of the drum and which has formed therein a dust inlet and a remediated products outlet. A scraper may be provided which rotates with the drum and which conveys dust and remediated soil through the shroud and out of the outlet. In order to avoid undue agitation of the fine dust particles, lifter flights are provided in the drum which shower remediated soil onto the dust in the shroud, thus covering the dust.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT RESUME

Pursuant to the invention, a soil remediation system is provided using the heat from remediated soil to vaporize volatiles from contaminated dust without pollution. Preferably, this remediation takes place in a dust remediator which is located proximate a primary treatment unit for contaminated soil, which vaporizes volatiles from the dust using heat from remediated soil, and which directs the volatiles into the primary treatment unit for oxidation. The primary treatment unit may comprise a rotary drum, and the dust remediator may comprise a shroud covering the remediated soil outlet end of the drum and receiving the remediated soil and the dust. The remediated soil and the dust are combined in the shroud so as to maximize vaporization of contaminants while minimizing agitation of the dust and inhibiting re-entrainment of dust in the gas stream, and the combined soil and dust are then discharged together from a remediated products outlet of the shroud.

System Overview

Figure 1:
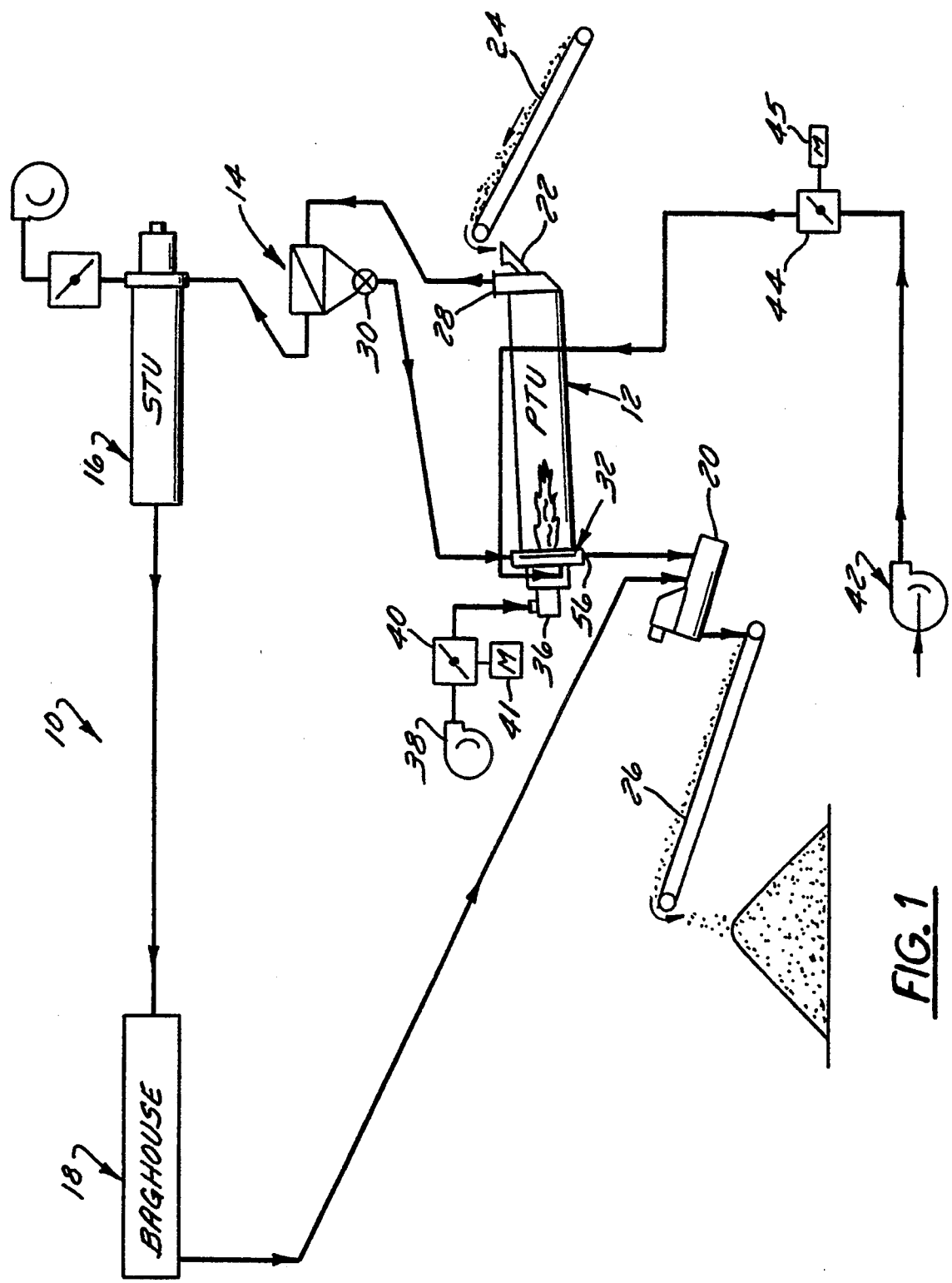
FIG. 1 is a schematic view of a portion of a soil remediation system constructed in accordance with the preferred embodiment of the invention.

Referring now to FIG. 1, a soil remediation system 10 constructed in accordance with a preferred embodiment of the invention is designed to remediate by heat treatment soil contaminated with hydrocarbons or other volatile materials. System 10 could comprise any system using heat to drive volatile contaminants from soil and preferably comprises a low temperature thermal desorption (LTTD) system operating at relatively low temperatures of 500° F. to 800° F. to vaporize hydrocarbons and other volatiles in the soil while leaving the soil otherwise unchanged. The LTTD system 10 includes as its primary components a soil remediation unit or primary treatment unit (PTU) 12, a first separator 14, a secondary treatment unit (STU) 16, a baghouse 18, and a mixer 20. The STU 16 preferably comprises an afterburner which heats the exhaust gases from PTU 12 to about 1500° F. and thereby incinerates the volatiles in the gas stream. The mixer 20 preferably comprises a standard pugmill.

In use, contaminated soil is fed into an inlet 22 of PTU 12 via a suitable feed conveyor 24 and then remediated as detailed below. The remediated soil is then discharged from an outlet of the PTU 12 and then discharged to pugmill 20, where it is mixed with other materials before being fed to a discharge conveyor 26. Gases produced in the PTU 12 during the remediation process flow out of an exhaust outlet 28 in the PTU 12 and into the first separator 14, where at least the larger dust particles entrained by the exhaust gases are removed before the gases are fed to STU 16. The remaining volatiles are then remediated through incineration in STU 16, and the gas stream is then fed to the baghouse 18 where most of the remaining particles are separated from the gas stream. These particles are then returned to the pugmill 20 for mixing with the remediated products discharged from PTU 12.

The STU 16, baghouse 18, and pugmill 20 are per se known and thus will not be described in greater detail. Other components of the system 10 which could be provided but which are not illustrated, such as a heat exchanger located between the STU 16 and the baghouse 18, likewise are well known and thus will not be detailed.

The first separator 14 preferably comprises a so-called multi-cone type cyclone separator in which at least the larger particles of dust entrained by the gases exhausted from the PTU 12 are removed by gravity and discharged from an outlet 30. The dust removed from the outlet 30 of multicone separator 14 is contaminated for reasons discussed below. Pursuant to the invention, this dust is remediated in a dust remediator 32 located proximate the PTU 12 and then discharged to the pugmill 20. Preferably, the remediator 32 is mounted on the end of the PTU 12 and directs volatiles driven from the dust back into the PTU. A particularly preferred construction of the PTU 12 and remediator 32 will now be described.

Construction and Operation of Primary Treatment Unit and Dust Remediator

Figure 2A:
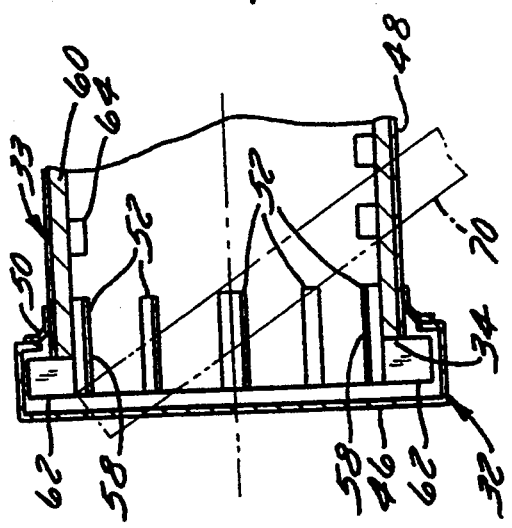
FIG. 2A is a sectional elevation view of a portion of the primary treatment unit and dust remediator of FIG. 2.
Figure 2:
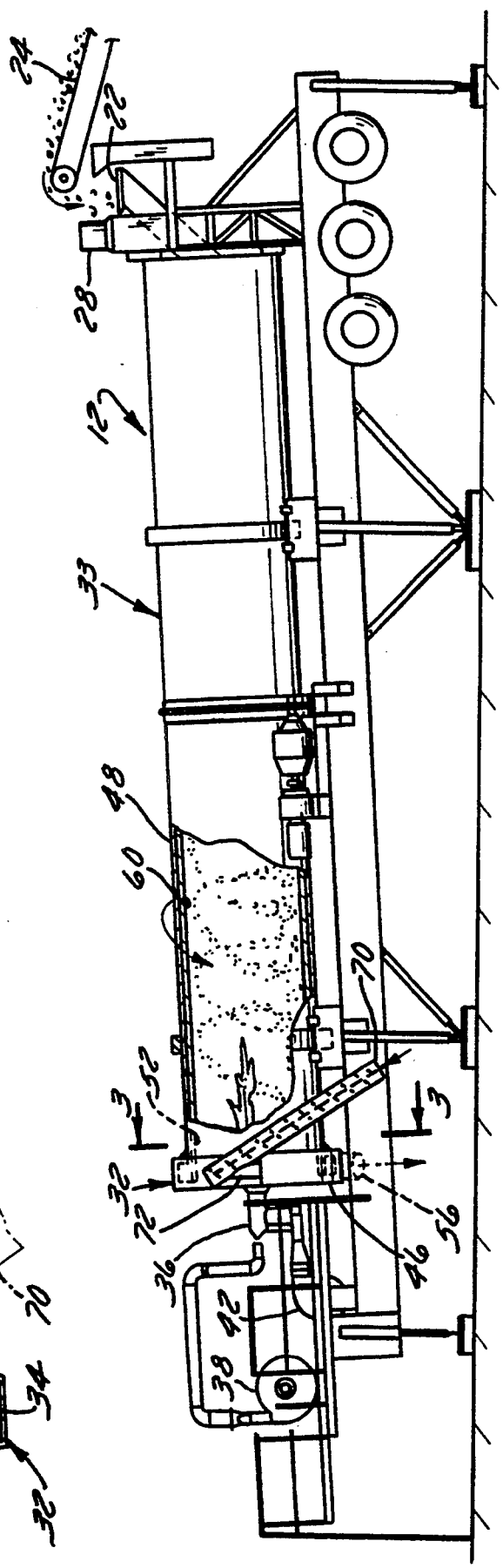
FIG. 2 is an elevation view of the primary treatment unit and associated burner and dust remediator of the soil remediation system of FIG. 1.
Figure 3:
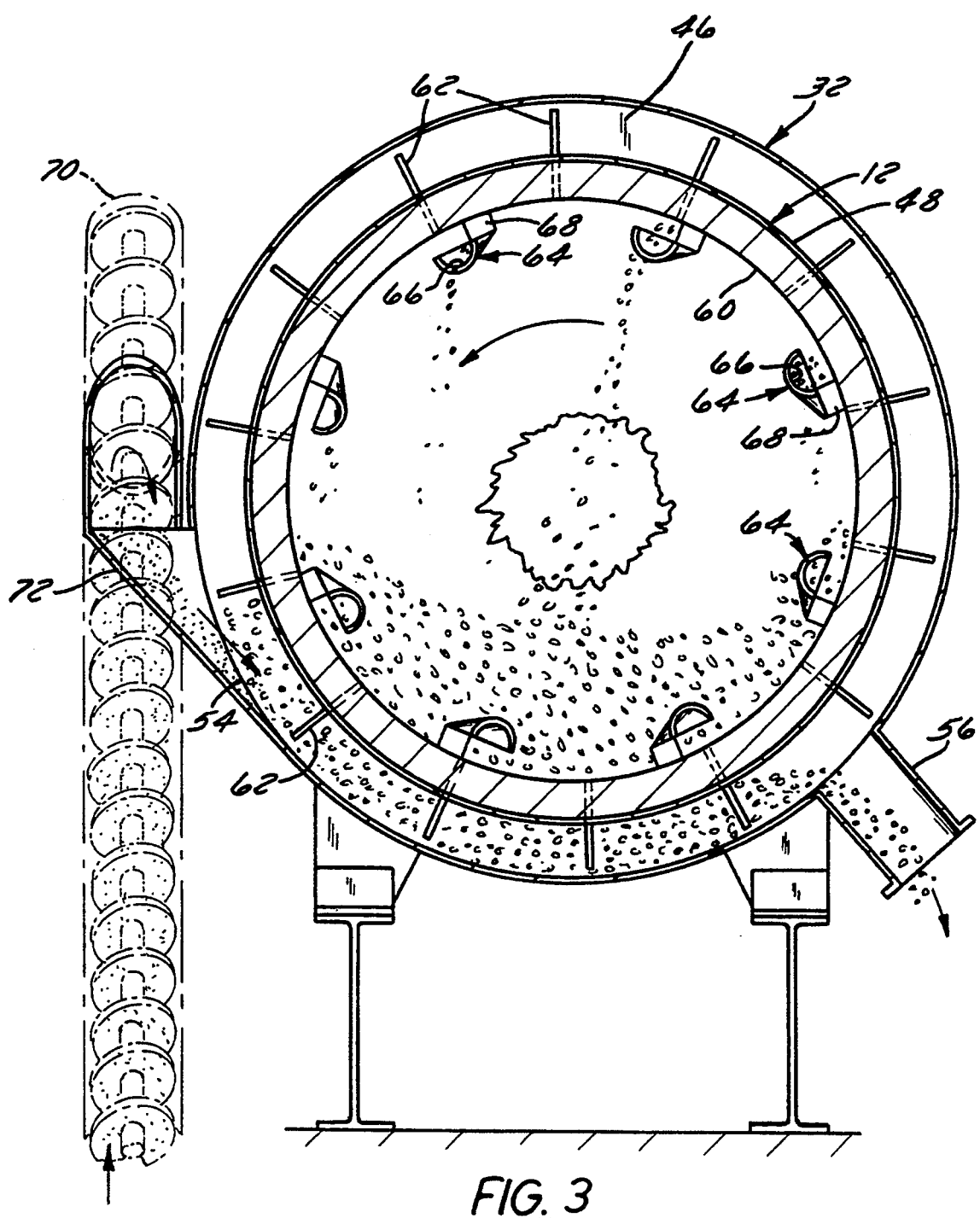
FIG. 3 is a sectional end view taken generally along the lines 3—3 in FIG. 2.

Referring to FIGS. 1-3, the PTU 12 preferably comprises an inclined rotary drum 33 having located at one end thereof the contaminated soil inlet 22 and the exhaust gas outlet 28 and having located at the other end thereof a remediated soil outlet 34 opening into the dust remediator 32. Drum 33 is formed from an outer cylindrical shell 48 at least the outlet end of which is lined with a refractory liner 60. A burner 36 supplies heat to the outlet end of the drum 33 to remediate the soil. Combustion air is supplied to the burner 36 by a blower 38 and a variable-restriction damper 40 controlled by a motor 41. If desired, injection air may be added to the drum 33 via a blower 42 and a variable restriction damper 44 controlled by a motor 45.

The dust remediator 32 preferably includes a stationary shroud 46 sealingly connected to the outer shell 48 of the rotating drum 33 by a suitable boot 50. Shroud 46 is annular in shape and has a diameter which is greater than that of the shell 48 so that it may receive paddle shaped scrapers 52 which convey materials from a contaminated dust inlet 54 to a remediated products outlet 56 thereof. More specifically, each scraper 52 comprises a longitudinal support portion 58 fixed to the shell 48 of the drum 33 and a paddle portion 62 extending longitudinally into the shroud 46 and projecting radially towards the outer periphery of the shroud. Thus, upon rotation of the drum 33, the paddle portions 62 of scrapers 52 rotate within the shroud 46 to propel materials in the shroud towards the outlet 56.

As can be seen in FIG. 3, the drum 33 and shroud 46 cooperate so as to be capable of covering dust in the shroud with remediated soil as the dust is propelled by the scrapers 52 from the inlet 54 towards the outlet 56. To this end, a plurality of lifter flights 64 are mounted around the inner periphery of the refractory liner 60 adjacent the outlet end of the drum 33. Each flight 64 includes a support leg 68 projecting radially inwardly from refractory liner 60 and a generally cup-shaped lifter 66 mounted on the support leg 68 and facing towards the refractory liner 60.

In operation, contaminated soil is fed into the inlet 22 of the drum 33 by the feed conveyor 24 and is heated by burner 36 as it travels through the drum 33 so as to be remediated by the time it approaches the outlet 34 of the drum. The gases produced by this remediation process entrain dust particles as they flow through the drum and entrain additional particles as they flow through the contaminated soil being fed into the inlet 22 on their way to exhaust outlet 28. The gases exhausted from exhaust outlet 28 are thus heavily laden with dust particles, many of which are highly contaminated because they were entrained by the gases before they could be fed all the way into the drum 33. At least some of these dust particles are removed by the separator 14 in the manner described above and discharged from outlet 30.

Pursuant to the invention, the dust discharged from the outlet 30 of separator 14 is conveyed by a screw 70 to an inlet chute 72 of the shroud 46 forming the dust remediator 2, where it is fed into the dust inlet 54 of the shroud 46. The dust in the shroud 46 is remediated by direct heat transfer from the hot remediated soil emptied into the shroud from the outlet 34 of drum 33. Because the dust is very fine and thus would be undesirably agitated if it were thoroughly mixed with the remediated soil, the heat transfer is performed by first feeding the dust into the inlet 54 of the shroud, and by then covering the dust with remediated soil. This covering is achieved by showering remediated soil from the outlet 34 of drum 33 onto the dust by the J-shaped flights 62 as the dust is propelled from the inlet 54 to the outlet 56 by the scrapers 52. Due to the relatively slow rotation of the dream of approximately 2 to 3 rpm, the dust remains combined with the hot remediated soil in the shroud 46 for a sufficient time for volatiles to be vaporized by heat from the soil. The released volatiles are directed into the interior of drum 33 by an exhaust fan located downstream from the PTU, where a portion of the vapors may be oxidized, and the remainder treated in the STU. Because the dust is not recirculated back into the drum 33 during this process, re-entrainment of the particles back into the gas stream exiting the drum is prevented or at least greatly inhibited. After the volatiles in the dust are vaporized and oxidized, the remediated soil and dust are discharged together from the remediated products outlet 56 of the shroud 46, mixed in the pugmill 20 with the dust from the baghouse 18 as described above, and discharged from the system by conveyor 26.

Many changes and modifications could be made to the present invention without departing from, the spirit and scope thereof. For instance, the dust remediation system need not be used in conjunction with an LTTD type remediation system of the type described above, but could be employed with an incinerator or any other device which employs heat to remediate contaminated soil. Moreover, some or all of the dust being remediated need not be removed from the separator 14, but could come from any source of contaminated dust. Similarly, the dust remediator 32 need not cooperate with the primary treatment unit 12 as described and illustrated so long as it provides direct or indirect heat transfer from the remediated soil to the dust and directs the vaporized volatiles from the dust into the interior of the primary treatment unit. Other changes and modifications which could be made without departing from the spirit and scope of the invention will become more readily apparent from a reading of the appended claims.

I claim:

1. A method of remediating dust, comprising:
   A. driving volatiles from said dust, at a location outside of but proximate a remediated soil outlet of a soil remediation unit, using heat from soil remediated by said soil remediation unit to vaporize said volatiles; then
   B. directing said volatiles into said soil remediation unit: and then
   C. oxidizing at least a portion of said volatiles in said soil remediation unit.

2. A method as defined in claim 1, wherein said driving step comprises
   A. conveying said dust to said location, and then
   B. covering said dust with said remediated soil, thereby transferring heat from said remediated soil to said dust to vaporize said volatiles.

3. A method of remediating soil, comprising:
   A. heating contaminated soil in a primary treatment unit to remediate said soil;
   B. removing said remediated soil from said primary treatment unit;
   C. withdrawing gases from said primary treatment unit, said gases having contaminated dust entrained therewith;
   D. separating at least a portion of said contaminated dust from said gases withdrawn from said primary treatment unit; then
   E. driving volatiles from said dust, at a location proximate but outside of a remediated soil outlet of said primary treatment unit, using heat from soil remediated by said primary treatment unit to vaporize said volatiles; then
   F. directing said volatiles into said primary treatment unit; and then
   G. oxidizing at least a portion of said volatiles in said primary treatment unit.

4. A method as defined in claim 3, wherein said primary treatment unit comprises a counterflow rotary drum cooperating with a burner and having a contaminated soil inlet located remote from said burner and said remediated soil outlet located adjacent said burner, and wherein said driving step includes
   feeding said portion of said dust into a stationary shroud covering said remediated soil outlet and
   covering said portion of said dust with said remediated soil, thereby transferring heat from said remediated soil to said dust and driving said volatiles from said dust by vaporizing said volatiles.

5. A method as defined in claim 4, wherein said covering step comprises showering said remediated soil onto said dust as said dust is conveyed through said shroud by a scraper, and further comprising removing said combined soil and dust from a remediated products outlet of said shroud.

6. A method as defined in claim 3, further comprising heating said gases and the remainder of said dust in a secondary treatment unit, and then separating the remaining dust from said gases.

7. A soil remediation system comprising:
A. a primary treatment unit having a contaminated soil inlet and a remediated soil outlet;
B. a burner which supplies heat to an interior of said primary treatment unit;
C. a separator which removes dust from gases exhausted from said primary treatment unit; and
D. a dust remediator, located proximate but outside of said primary treatment unit, which
   (1) receives dust from said separator,
   (2) drives volatiles from said dust using heat from remediated soil to vaporize said volatiles,
   (3) directs said dust away from primary treatment unit after said volatiles are driven off, and which
   (4) directs said volatiles into said primary treatment unit.

8. A soil remediation system as defined by claim 7, wherein said primary treatment unit comprises a rotary drum.

9. A soil remediation system as defined in claim 8, wherein said rotary drum is a counterflow drum having said remediated soil outlet located adjacent said burner.

10. A soil remediation system comprising:
A. a primary treatment unit having a contaminated soil inlet and a remediated soil outlet;
B. a burner which supplies heat to an interior of said primary treatment unit;
C. a separator which removes dust from gases exhausted from said primary treatment unit; and
D. a dust remediator, located proximate said primary treatment unit, which drives volatiles from said dust using heat from remediated soil to vaporize said volatiles, and which directs said volatiles into said primary treatment unit, wherein
   (1) said primary treatment unit comprises a rotary drum,
   (2) said remediated soil outlet comprises an outlet of said drum, and wherein
   (3) said dust remediator comprises a stationary shroud which covers said outlet end of said drum and which has formed therein a dust inlet and a remediated products outlet.

11. A soil remediation system as defined in claim 10, further comprising a scraper which rotates with said drum and which conveys dust and remediated soil through said shroud and out of said outlet.

12. A soil remediation system as defined in claim 10, further comprising lifter flights which shower remediated soil onto said dust in said shroud, thus covering said dust.

13. A soil remediation system as defined in claim 7, further comprising
A. a secondary treatment unit which heats said gases and the remainder of said dust, and
B. a second separator which separates the remaining dust from said gases after treatment by said secondary treatment unit.

14. A method as defined in claim 1, further comprising, following said step (A), directing said dust away from said soil remediation unit without directing said dust into said soil remediation unit.

15. A method as defined in claim 3, further comprising, following said step (E), directing said dust away from said primary treatment unit without directing said dust into said primary treatment unit.

* * * * *